United States Patent Office 3,671,251

Patented June 20, 1972

3,671,251

SENSITIZED PYRYLIUM PHOTOBLEACHABLE DYE IN GELATIN

Conrad G. Houle, Webster, and Thomas J. Masseth, Rochester, N.Y., assignors to Eastman Kodak Company, Rochester, N.Y.

No Drawing. Filed Dec. 10, 1970, Ser. No. 97,049
Int. Cl. G03c *1/72*
U.S. Cl. 96—89 16 Claims

ABSTRACT OF THE DISCLOSURE

A light sensitive layer comprising a gelatin binder, a photo-bleachable dye such as a pyrylium dye, a pyridinium dye or a cyanine dye, a sensitizer for the dye e.g., a thiourea sensitizer, and in a preferred aspects, a tanning agent for the gelatin, when coated on a suitable support, provides a negative working lithographic plate which, upon exposure, becomes differentially ink and water receptive to such a degree that it may be used in a printing operation without additional processing.

FIELD OF THE INVENTION

This invention relates to a composition useful in the preparation of a lithographic printing plate and more particularly to presensitized lithographic plates which become selectively ink receptive i.e., in an imagewise pattern, with no additional processing when exposed to light.

PRIOR ART

In the prior art, the processing of presensitized, negative working lithographic plates to form areas demonstrating a differential acceptance of ink and water, namely hydrophilic unexposed background areas and hydrophobic or oleophilic exposed images areas, has been carried out in a number of ways. Some processes based on crosslinking of photosensitive polymers require vigorous treatment with active solvents or hot vapors to remove the unexposed areas. Others, such as in the case of diazo materials, require swabbing with a solvent to obtain the required ink-water differential. Other plates require treatment with aqueous alkaline solutions.

A novel, non-silver, light-sensitive photographic system has been described in U.S. Patent No. 3,300,314 to Rauner et al., issued Jan. 24, 1967. This patent demonstrates the light-sensitive response of image-forming compounds and sensitizing compounds in a water-insoluble but water-permeable organic colloidal binder material. It further points out that such materials when coated on silicated, grained aluminum supports, can be exposed, treated with warm water and then swabbed with a desensitizing etch to show the above-described, required lithographic ink-water differential. Thus, the patent discloses the usefulness of certain components of the type that which will be described below in the area of lithography. However, they are disclosed as operable only in a context which requires the use of post-exposure treatments to produce differential ink-water receptivity of the kind necessary in the production of a useful lithographic printing plate.

Of later, there has been a growing interest in simplifying such plate preparation processes so that the operation may be carried out more quickly and simply, with a minimum of equipment such as chemicals and processing machinery and/or storage and processing area.

It is therefore an object of the present invention to provide an "expose-only" presensitized lithographic plate that requires no additional processing.

It is also an object of this invention to provide a lithographic printing plate in which exposed image areas are rendered oleophilic while background areas remain hydrophilic.

Still another object of this invention is to provide a lithographic printing plate in which a gelatin layer is rendered ink-receptive by exposure alone to provide a printing image surface without a chemical processing step.

Still other objects and advantages will become apparent from a consideration of the following specification and appended claims.

SUMMARY OF THE INVENTION

The objects of the present invention are accomplished with a light-sensitive composition including gelatin, containing therein, a light-sensitive bleachable dye, a dye sensitizer and in a preferred embodiment, a gelatin tanning agent.

More particularly, the objects of this invention are accomplished with a light-sensitive composition comprising gelatin containing therein (a) as an image forming component, at least one bleachable dye selected from either a pyrylium compound having the formula:

I.

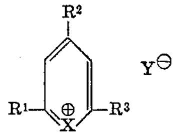

wherein each of $R^1$, $R^2$ and $R^3$ represents a member selected from either an aliphatic group, an alkoxy group or an aryl group; $X^{\oplus}$ represents a hetero atoms selected from either an oxygen atom, a sulfur atom or a selenium atom, and $Y^{\ominus}$ represents an anion, or those selected from either a 2-β-anilinovinyl-1-methoxypyridinium salt, a 1-anilinovinyl-3′-ethyl-4,6-di-p-tolyl-2-pyridothiacarbocyanine salt, a 3′-ethyl-1-(4-methylanilino)-4,6-di-p-tolyl-2-pyridothiacarbocyanine salt, a 1,1-dimethoxy - 2,2′ - diphenyl-3,3′-indolocarbocyanone salt, and a 1-methoxy-1′-methyl-2,2′, 10-triphenyl-3,3′-indolocarbocyanine salt, and (b) as a sensitizer, at least one light absorbing compound that contains a group selected from either thiocarbonyl, mercapto, carbonyl peroxide or thioether.

Generally, any relatively pure gelatin which does not contain ink receptive impurities and/or adulterants which can affect the photo-chemical reaction of the dye and sensitizer may be used in the successful practice of the invention, although photographic emulsion grade gelatin is clearly preferred.

The bleachable dyes that are useful in the recited photographic compositions are desirably dyes that are bleached by exposure to light including actinic rays. Included are such bleachable dyes as pyrylium dyes, including thiapyrylium dyes and selenapyrylium dyes as well as additional dyes like certain pyridinium salts and carbocyanine dyes.

The pyrylium, thiapyrylium and selenapyrylium salts used to advantage in the recited compositions include those represented by the formula:

I.

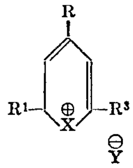

wherein $R^1$, $R^2$ and $R^3$ each represents either an aliphatic group having from 1 to 15 carbon atoms, such as methyl, ethyl, propyl, isopropyl, butyl, tertiary butyl, amyl, isoamyl, hexyl, octyl, nonyl, dodecyl, 2,6 - diphenylthia-4-pyramylidenemethyl, ethylene, styrylvinylene, styryl, alkoxystyryl, diethoxystyryl, dimethylaminostyryl, 1-butyl-4-p-dimethylaminophenyl - 1,3 - butadienyl, β-ethyl-4-dimethylaminostyryl - 6 - phenylhexatrienyl-(1,3,5); an alkoxy group such as one having 1 to 8 carbon atoms like pentyloxy, methoxy, ethoxy, propoxy, butoxy, hexyloxy, octyloxy, etc.; an aryl group such as phenyl, 4-biphenyl, 2,3,4,6 - tetraphenyl, naphthyl, phenanthryl, phenylbenzo [b], and including alkylphenyl, such as 4 - ethylphenyl, 4 - propylphenyl, etc., alkoxyphenyl, e.g., 4 - ethoxyphenyl, 4 - methoxyphenyl, 4 - phenyloxyphenyl, 2 - hexyloxyphenyl, 2 - methoxyphenyl, 2 - amyloxyphenyl, 3,4 - dimethoxphenyl, etc., acetoxyphenyl, and ω-hydroxyalkoxyphenyl, e.g., 4 - chlorocarbomethoxyphenyl, 2 - hydroxyethoxyphenyl, 3 - hydroxyethoxyphenyl, etc., 4 - hydroxyphenyl, halophenyl, e.g., 3,4 - dichlorophenyl, 3,4 - dibromophenyl, 4 - chlorophenyl, 2,4 - dichlorophenyl, etc., azidophenyl, nitrophenyl, etc., aminophenyl, e.g., 4 - diethylaminophenyl, 4 - dimethylaminophenyl, etc., $X^{\ominus}$ is a hetero atom, such as oxygen, sulfur and selenium; and $Y^{\ominus}$ represents an anionic function, such as, for example, perchlorate, fluoborate, nitrate, chloride, bromide, chloroaluminate, chloroferrate, sulfate, bisulfate, sulfacetate, methosulfate, alkanoates, such as acetate and especially trifluoroacetate, trichloroacetate, etc., aromatic sulfonates, such as p-toluene sulfonate, etc., anions from aromatic carboxylic acids, such as benzoate, and especially p-nitrobenzoate, 2,4 - dinitrobenzoate, the trinitrobenzoates, etc.

In addition to the pyrylium, thiapyrylium and selenapyrylium salts described above, various other modifications can be made such as 2,3,4,6 - tetra substituted derivatives, bispyrylium and thiapyrylium salts, such as octamethylene-2,2′-bis[4,5-di - (4 - methoxyphenyl)pyrylium fluoborate] and derivatives formed from a methyl substituted pyrylium salt and a cyclic ketone, such as 2,6-dimethyl-4-pyrone.

Included among the pyrylium, thiapyrylium and selenapyrylium salts that are used to advantage according to the invention are the following:

2,6-diphenyl-4-p-aminophenylthiapyrylium perchlorate,
2,6-di-p-methoxyphenyl-4-phenylthiapyrylium chloride,
2,6-diphenyl-4-p-aminophenylselenapyrylium perchlorate,
2,6-diphenyl-4-β-carbomethoxyphenylpyrylium perchlorate,
2,6-diphenyl-4-β-aminophenylpyrylium perchlorate,
2,6-diphenyl-4-β-dimethylaminophenylthiapyrylium chloride,
4,6-diphenyl-2-(4-dimethylaminostyryl) pyrylium sulfoacetate,
2,6-di-β-carbomethoxyphenyl-4-phenylpyrylium fluoroborate,
2,6-di-(p-methoxyphenyl)-4-phenylpyrylium fluoroborate,
4-p-aminophenylthiapyrylium perchlorate, and
2,6-bis-3,4-methoxypyrylium dihydrogen phosphate.

Still other bleachable dyes that are useful in the present invention include photobleachable pyridinium salts and carbocyanine dyes such as 2-β-anilinovinyl-1-methoxypyridinium p-toluene sulfonate,
1-anilinovinyl-3′-ethyl-4,6-di-p-tolyl-2-pyridothiacarbocyanine perchlorate,
3′-ethyl-1-(4-methylanilino)-4,6-di-p-tolyl-2-pyrido-thiacarbocyanine perchlorate,
1,1-dimethoxy-2,2′-diphenyl-3,3′-indolocarbocyanine perchlorate, and
1-methoxy-1′-methyl-2,2′,10-triphenyl-3,3′-indolocarbocyanine perchlorate.

In addition to the bleachable dyes recited elsewhere herein, certain bleachable ferrocene dyes can be used in the present elements. Included within the range of useful ferrocene dyes are those described in Belgian Pat. 740,934. More particularly, advantageously employed ferrocene dyes include such compounds as 3-methyl-2-ferrocenylidenemethyl-4,5-dihydrothiazolium iodide,
3-butyl-2-ferrocenylidenemethyl-4,5-dihydrothiazolium iodide,
3-butyl-2-ferrocenylidenemethylbenzothiazolium-p-toluene sulfonate,
1,3,3-trimethyl-2-ferrocenylidenemethylbenz[e]indolium iodide,
3-ethyl-2-ferrocenylidenemethylbenzotdiazolium p-toluene sulfonate,
1-methyl-2-ferrocenylidenemethylpyridinium-p-toluene sulfonate,
3-methyl-2-ferrocenylidenemethylbenzothiazolium p-toluene sulfonate,
2-ferrocyenylidenemethylbenzothiazolium-3-n-butyl sulfonate,
3-methyl-2-ferrocenylidenemethylbenzothiazolium iodide,
1-ethyl-2-ferrocenylidenemethylquinolinium iodide,
3-ethyl-2-ferrocenylideneprop-1-enylbenzothiazolium bromide,
3-methyl-2-ferrocenylidenepenta-1,3-dienylbenzoxazolium iodide,
2,4-diphenyl-6-(β-ferrocenylvinyl)pyrylium fluoroborate,
2-(β-ferrocenylvinyl)-4,6-dichlorophenylpyrylium perchlorate,
2-(β-ferrocenylvinyl)-4-(4-amyloxyphenyl)-6-(4-methoxyphenyl)pyrylium sulfate,
2-(β-ferrocenylvinyl)-4-phenyl-6-(4-methoxyphenyl) thiapyrylium fluoroborate,
2-(β-ferrocenylvinyl)-4-phenyl-6-(4-dimethylaminostyryl)thiapyrylium perchlorate,
2-(β-ferrocenylvinyl)-4-(4-methoxyphenyl)-6-(4-ethylphenyl)thiapyrylium chloride,
2,4-diphenyl-6-(4-ferrocenylbuta-1,3-dienyl)pyrylium perchlorate,
2-(6-ferrocenylhexa-1,3,5-trienyl)-4,6-di(4-ethylphenyl)pyrylium fluoroborate,
3-ethyl-5-ferrocenylidene rhodanine,
3-(β-sulfoethyl)-5-ferrocenylidene rhodanine sodium salt,
2-phenylimino-3-cetyl-5-ferrocenylidene-4-thiazolidone,
1,3-diethyl-5-ferrocenylidene-2-thiobarbituric acid,
3-ethyl-5-(ferrocenylprop-2-enylidene)rhodanine, and
1,3-diethyl-5-(ferrocenylpenta-2,4-dienylidene) thiobarbituric acid.

In Belgian Pat. 740,934, however, the ferrocene compounds are not bleached by exposure to actinic rays including ultraviolet light, but only to visible radiation. Inclusion of the presently recited sensitizers operate to render the ferrocene dyes sensitive to actinic rays and, it is felt, heighten the efficiency of their photoresponse.

The above-mentioned bleachable dyes are desirably combined with image-promoting sensitizer compounds that render the dyes either sensitive or additionally sensitive to the appropriate portion of the spectrum, e.g., actinic rays, that provides a suitably high energy exposure source. Advantageous sensitizers include light-absorbing (i.e., visible or actinic rays) compounds that contains a group selected from either thiocarbonyl, mercapto, carbonyl peroxide or thioether. Exemplary sensitizers include such compounds as:

A.

$$H_2N-\overset{\overset{\displaystyle S}{\|}}{C}-NH-CH_2CH=CH_2$$

1 allyl-2-thiourea

B.

$$C_2H_5-NH-\overset{\overset{\displaystyle S}{\|}}{C}-NH-C_2H_5$$

S-Diethyl thiourea

C.

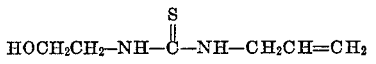

N-allyl—N'—(β-hydroxyethyl)thiourea

D.

$N(CH_2CH_2OH)_3$ 2,2',2''-Nitrilotriethanol

E.

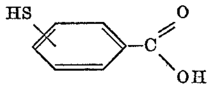

Mercaptobenzoic acid

F.

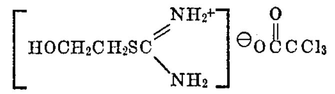

2-Hydroxyethylisothiuronium trichloroacetate

G.

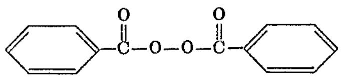

Benzoylperoxide

H.

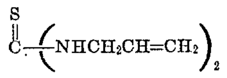

Diallylthiourea

I.

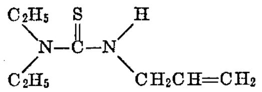

3-allyl-1,1-diethyl-2-thiourea

As previously mentioned, the combination of gelatin with a bleachable dye of the recited type and a sensitizer provides a photographic composition that, when presented as a layer, can be used as a lithographic printing surface after an imagewise exposure; no further processing is required.

Although the respective proportions of gelatin, dye and sensitizer can be widely varied depending on the requirements of any particular situation, it is typical that the sensitizer is included in a weight ratio of from about 1:4 to about 1:1 based on the gelatin, and that the bleachable dye is included in a weight ratio of from about 1:30 to about 1:1 based on the sensitizer.

In a particularly advantageous embodiment, a photographic composition of the type recited herein can be solvent coated on a support to prepare a photographic element that is desirable as a presensitized lithographic printing plate. In preparing the photographic elements a mixture of at least one bleachable dye with at least one sensitizer are dissolved in any suitable solvent, e.g., acetone, methoxyethanol, ethoxyethanol, methanol, hexanone, methylcellosolve acetate, ethylacetate, toluene, xylene, chlorobenzene, trichloroethylene, methylenechloride, ethylenechloride, propylene chloride, water, etc., or various mixtures of these. In general, any solvent can be used that will dissolve the dyes and sensitizer compounds and dissolve or suspend the binder. The dye-sensitizer solution is then admixed with solubilized gelatin or alternatively, gelatin can be added to the dye-sensitizer solution and dissolved or suspended therein. After the preparation of such a coating solution, it can be coated on a support by any of the well known coating techniques, e.g., whirl coating, doctor blade coating, hopper coating, flow coating, etc., used in coating photographic elements including photolithographic plates.

Support materials useful herein include a wide variety of photographic film base materials like polyethylene coated paper, poly(ethylene terephthalate) or cellulose ester sheeting, i.e., cellulose acetate, cellulose triacetate, cellulose acetate butyrate, etc., as well as grained or ungrained and subbed aluminum, zinc or other metal supports which are generally used in the manufacture of printing plates. Since the gelatin layer is not washed away, the support need not be limited to water retaining supports of the type used in lithography, but can include additional support materials like polycarbonates, poly(vinylbutyral) and the like that are widely used as photographic support materials.

Any number of subs or other adhesion improving elements may be applied to the support or alternatively the support can be treated with conventional techniques to improve the adhesive properties thereof. For example, according to a preferred embodiment of the invention the support used is a gel subbed, grained aluminum plate, the gel subbing providing improved adhesion of the overlaying gelatin layer.

In a preferred embodiment of the invention, a non-oleophilic gelatin tanning agent is also included in the photographic compositions described herein. Although formaldehyde has been incorporated into each of the coating formulations used in the examples below, it should be noted that the formaldehyde is incorporated primarily as a "prehardener" and that any number of other tanning agents which do not demonstrate ink receptivity, i.e., non-oleophilic gelatin tanning agents, can be used in the alternative. By way of explanation of the term "prehardener," it has been our experience that when the formaldehyde or some other gelatin tanning agent of the type described is excluded from the light-sensitive, gelatin bound coatings of the present invention and these coatings are exposed to light, the gelatin will be tanned, but not to a degree that is considered sufficient to serve as a long-run lithographic plate. Coating formulations that omit a gelatin tanning agent are especially useful for limited runs, but, where a long-run capability is desired, it becomes advantageous to "preharden" the gelatin to a degree which permits the formation of a stable, firm layer prior to exposure, so that upon exposure to light the supplementary tanning caused by the presence of the dye and sensitizer hardens the coating to the point of demonstrating an extended run capability on a lithographic or offset printing press.

Any number of tanning agents, i.e. acid or other aldehyde tanning agents, preferably those which do not exhibit ink receptivity, i.e., non-oleophilic tanning agents, may be substituted for the formaldehyde prehardener. For example, succinaldehyde and glutaraldehyde have proven successful in this role while the highly ink receptive catechols have proven less desirable for the production of a desirable printing plate. The tanning agents are included in an amount sufficient to promote hardening of the gelatin. The specific amount can vary depending on the particular situation, but generally an amount of from about 15 to about 40 weight percent based on the amount of gelatin is useful.

The printing plates of this invention are prepared using conventional preparation techniques. According to a preferred embodiment of the invention, the bleachable dye is dissolved in a water-organic solvent mixture (preferably water-alcohol mixture), the binder, preferably gelatin, a binder hardener, usually formaldehyde, a surfactant to insure proper dispersion of the colloid and a sensitizer are added to the solution and thoroughly mixed. The mixture thus formed is coated onto a support, such as grained aluminum sheeting, and after drying, the coated plate is exposed imagewise to light. Conventional plate exposing equipment can be used and exposures of about two minutes to actinic light in a graphic arts contact exposing device have been found adequate to provide a plate having desirable ink-water differential, although longer periods of up to about 15 minutes or longer may be used to provide a tougher gelatin coating and hence longer run capability in the plate, or to compensate for lower lumen level lamps.

The light-sensitive composition is coated to advantage on the support by any of the well known coating techniques, such as those described above, used in coating photographic elements and/or lithographic plates.

The following examples will serve to further illustrate our invention:

Example 1

To 3 cc. of methanol is added 0.025 g. of 2,6-diphenyl-4-p-aminophenylthiapyrylium perchlorate. The mixture is stirred until the salt is completely dissolved. To this are added 2.5 cc. of a 5 percent aqueous formaldehyde solution, 5 cc. of water, 4 cc. of 5 percent gelatin solution with saponin as a dispersing agent, and 0.2 g. 1-allyl-2-thiourea. The mixture is doctor blade coated on a gelatin subbed grained aluminum support at a coating block temperature of about 110–120° F. and allowed to dry. A portion of the coating is exposed to the ultraviolet-rich rays of a 500 watt $R_2$ photoflood lamp, at a distance of approximately 6 inches from the exposure plane, through a high contrast negative for 6–8 minutes. The portion is then placed on a lithographic press and printed copies are made in the conventional manner, with image areas corresponding to the areas of exposure. The plate shows good ink-water differential, and produces up to about 10,000 acceptable copies.

Example 2

The method of Example 1 is repeated except that 0.2 g. of N-allyl,N′-(β-hydroxyethyl) thiourea is used as the sensitizer. A similarly good lithographic plate having the same capability is produced.

Example 3

The method of Example 2 is repeated except that 2,6-di-(p-methoxyphenyl)-4-phenylthiapyrylium chloride is used as the dye to produce a plate which provides up to about 10,000 acceptable copies.

Example 4

The method of Example 2 is repeated except that 2,6-diphenyl-4-(p-carbomethoxyphenyl)pyrylium perchlorate is utilized as the dye to produce a plate having capabilities and characteristics equivalent to those of the plate of Example 2.

Example 5

A plate equivalent to that of Example 2 is produced using 2,6-diphenyl,4-aminophenyl pyrylium perchlorate as the dye.

Example 6

The method of Example 2 is again followed to produce another plate of equivalent quality containing 2,6-diphenyl-4-(p-dimethylaminophenyl)thiopyrylium chloride as the dye.

Example 7

The method of Example 2 is again repeated using 4,6-diphenyl-2-(4-dimethylaminostyryl)pyrylium sulfoacetate as the dye to produce a plate and print 10,000 acceptable copies.

Example 8

The preparation of Example 2 is repeated to produce a useful plate exhibiting acceptable ink-water differential when 2,6-di-(β-carbomethoxyphenyl)-4-phenylpyrylium fluoroborate is used as the dye.

Example 9

2,6-di-(p-methoxyphenyl)-4-phenylpyrylium fluoroborate is used in the method of Example 2 and a useful plate results.

Example 10

The procedure of Example 2 is repeated to prepare five elements (A–E), except that equivalent amounts of the following bleachable dyes are used:

| Element: | Dye |
|---|---|
| A | 2-β-anilinovinyl-1-methoxypyridinium p-toluene sulfonate. |
| B | 1-anilinovinyl-3′-ethyl-4,6-di-p-tolyl-2-pyridothiacarbocyanine perchlorate. |
| C | 3′-ethyl-1-(4-methylanilino)-4,6-di-p-tolyl-2-pyridothiacarbocyanine perchlorate. |
| D | 1,1-dimethoxy-2,2′-diphenyl-3,3′-indolocarbocyanine perchlorate. |
| E | 1-methoxy-1′-methyl-2,2′,10-triphenyl-3,3′-indolocarbocyanine perchlorate. |

Each exposed plate exhibits an acceptable ink-water differential and is used to produce copies of a commensurate quality.

Example 11

A coating solution is prepared containing

Methanol—9.6 cc.
4-p-aminophenyl thiapyrylium perchlorate—0.05 g.
Formaldehyde 5% aqueous—5.0 cc.
Gelatin (5% aqueous) containing saponin—9.0 cc.
N-allyl, N′-(β-hydroxyethyl thioura)—0.35 g.

The mixture is thoroughly mixed and doctor black coated on a gelatin subbed grained aluminum support at about 110° F. and allowed to dry. The dried coating is then exposed for 2 min. through a high contrast negative to the ultraviolet-rich rays of a carbon arc lamp held about 2 feet from the exposure plan. A brief water rinse of 15 seconds is then given the exposed plate to hydrate unexposed areas, and a successful run of 10,000 copies is then made on a lithographic printing press.

Example 12

To the following formulation:

0.05 g. 2,6-di-phenyl-4-(p-aminophenyl)thiapyrylium perchlorate
0.35 g. N-allyl-N′-(β-hydroxyethyl)thiourea MeOH 3.0 cc. methyl alcohol is added; 8 cc. 2½ percent Zein (a natural prolamine polymer derived from maize) in 90% $H_2O$—10% EtOH mixture;

Light exposure of coatings of this formulation using the methods of Example 11, on grained aluminum result in bleached images with no observable ink receptivity.

Example 13

To the bleachable dye sensitizer formulation of Example 12 is added 8 cc. of 5 percent aqueous polyvinyl alcohol. Coatings of this formulation on grained aluminum base are made according to the procedure of Example 11. After drying, they are exposed as in Example 11. The dye is bleached in exposed areas, and after a water rinse also as in Example 11, the exposed regions appear in relief images which indicate that crosslinking has taken place. No ink receptivity is observed when the image is tested with a greasy printing ink.

Example 14

A coating solution including:

7 cc. 1.5 percent polyacrylamide (marketed as polyacrylamide No. 17569 by the K&K Corp.) in water.

3 cc. water 0.05 g. 2,6-bis-(3,4-methoxy pyrylium dihydrogen phosphate 0.2 g. N-allyl-N'(Beta-hydroxyethyl) thiourea is coated on a grained lithographic base as in Example 11. After drying, light exposure of this formulation as in Example 11 followed by a like water rinse produces a clear relief image like that of Example 13. The image does not accept ink when tested as in Example 13.

From the foregoing examples, it is clear that when gelatin is used as the binder in the photo-bleachable dye-sensitizer system a useful printing plate, demonstrating good ink-water differential, is produced. As demonstrated by Examples 12–14, however, when the binder component is represented by Zein, polyvinyl alcohol or polyacrylamide materials, no useful or ink receptive plate is produced.

The pyrylium and thiapyrylium salts used in the invention are prepared, in general, by the methods described in U.S. Pat. No. 3,250,615. As an example, 4,6-diphenyl - 2 - (4 - dimethylaminostyryl)pyrylium sulfoacetate is prepared by condensing acetophenone with dimethylaminobenzaldehyde in the presence of acetic anhydride and sulfonic acid, and 2,6 - di - p - carbomethoxyphenyl - 4 - phenylpyrylium fluoroborate is prepared by condensing p-methoxyacetophenone with benzaldehyde in the presence of boron trifluoride etherate.

The invention has been described in considerable detail with particular reference to certain preferred embodiments thereof, but it will be understood that variations and modifications can be effected within the spirit and scope of the invention.

We claim:

1. A light-sensitive composition comprising gelatin containing therein (a) as an image-forming component, at least one bleachable dye selected from the class consisting of (1) a pyrylium compound having the formula:

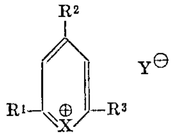

wherein each of $R^1$, $R^2$ and $R^3$ represents a member selected from the group consisting of an aliphatic group, an alkoxy group and an aryl group; $X^{\oplus}$ represents a hetero atom selected from the class consisting of an oxygen atom, a sulfur atom and a selenium atom; and $Y^{\ominus}$ represents an anion, and (2) those selected from the class consisting of a 2 - β - anilinovinyl - 1 - methoxypyrydinium salt, a 1 - anilinovinyl - 3' - ethyl - 4,6 - di-p - tolyl - 2 - pyridothiacarbocyanine salt, a 3' - ethyl - 1 - (4 - methylanilino) - 4,6 - di-p - tolyl - 2 - pyridothiacarbocyanine salt, a 1,1 - dimethoxy - 2,2' - diphenyl - 3,3' - indolocarbocyanine salt, and a 1 - methoxy - 1' - methyl - 2,2',10 - triphenyl - 3,3' - indolocarbocyanine salt, and (b) as a sensitizer, at least one light absorbing compound that contains a group selected from the class consisting of thiocarbonyl, mercapto, carbonyl peroxide and thioether.

2. A light-sensitive composition as described in claim 1 wherein said composition additionally contains a non-oleophilic tanning agent for gelatin.

3. A light-sensitive composition as described in claim 1 wherein the sensitizer is selected from the group consisting of:

(a) 1-allyl-2-thiourea
(b) S-diethyl thiourea
(c) N-allyl-N'-(β-hydroxyethyl)thiourea
(d) 2,2',2''-nitrilotriethanol
(e) Mercaptobenzoic acid
(f) 2-hydroxyethylisothiuronium trichloroacetate
(g) Benzoylperoxide 4. A light-sensitive composition as described in claim 1 wherein the pyrylium image forming compound is selected from the group consisting of 2,6-diphenyl-4-β-aminophenylthiapyrylium perchlorate,
2,6-di-β-methoxyphenyl-4-phenylthiapyrylium chloride,
2,6-diphenyl-4-β-carbomethoxyphenylpyrylium perchlorate,
2,6-diphenyl-4-β-aminophenylpyrylium perchlorate,
2,6-diphenyl-4-β-dimethylaminophenylthiapyrylium chloride,
4,6-diphenyl-2-(4-dimethylaminostyryl)pyrylium sulfoacetate,
2,6-di-β-carbomethoxyphenyl)-4-phenylpyrylium fluoroborate, and
2,6-di-(p-methoxyphenyl)-4-phenylpyrylium fluoroborate.

5. A light-sensitive composition comprising gelatin containing therein:

(a) as an image-forming component, at least one bleachable dye selected from the class consisting of:

(1) a pyrylium compound having the formula:

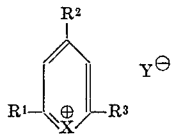

wherein each of $R^1$, $R^2$ and $R^3$ represents a member selected from the group consisting of an aliphatic group, an alkoxy group and an aryl group; $X^{\oplus}$ represents a hetero atom selected from the class consisting of an oxygen atom, a sulfur atom and a selenium atom; and $Y^{\ominus}$ represents an anion, and (2) those selected from the class consisting of a 2-β - anilinovinyl - 1 - methoxypyridinium salt, a 1 - anilinovinyl - 3' - ethyl - 4,6 - di - p - tolyl-2 - pyridothiacarbocyanine salt, a 3' - ethyl - 1-(4 - methylanilino) - 4,6 - di - p - tolyl - 2 - pyridothiacarbocyanine salt, a 1,1 - dimethoxy - 2,2' - diphenyl - 3,3' - indolocarbocyanine salt, and a 1 - methoxy - 1' - methyl - 2,2',10 - triphenyl-3,3'-indolocarbocyanine salt, and (b) as a sensitizer, at least one light absorbing compound selected from the class consisting of (1) 1-allyl-2-thiourea
(2) S-diethyl thiourea
(3) N-allyl-N'-(β-hydroxyethyl)thiourea
(4) 2,2',2''-nitrilotriethanol
(5) Mercaptobenzoic acid
(6) 2-hydroxyethyl isothiuronium trichloroacetate
(7) Benzoylperoxide, and (c) a non-oleophilic gelatin tanning agent.

6. A light-sensitive composition as described in claim 5 wherein the tanning agent is selected from the group consisting of formaldehyde, succinaldehyde and glutaraldehyde.

7. A light-sensitive composition comprising gelatin containing therein the bleachable dye 2,6-diphenyl-4-p-aminophenylthiapyrylium perchlorate, the sensitizer 1-allyl-2-thiourea and the gelatin tanning agent formaldehyde.

8. A light-sensitive composition comprising gelatin containing therein a bleachable dye selected from the class consisting of:

2,6-diphenyl-4-p-aminophenylthiapyrylium perchlorate,
2,6-di-(p-methoxyphenyl)-4-phenylthiapyrylium chloride,
2,6-diphenyl-4-(p-carbomethoxyphenyl)pyrylium perchlorate,
2,6-diphenyl-4-aminophenyl pyrylium perchlorate,
2,6-diphenyl-4-(p-dimethylaminophenyl)thiapyrylium chloride,
4,6-diphenyl-2-(4-dimethylaminostyryl)pyrylium sulfoacetate,
2,6-di-(β-carbomethoxyphenyl)-4-phenylpyrylium fluoroborate,
2,6-di-(p-methoxyphenyl)-4-phenylpyrylium fluoroborate, the sensitizer N-allyl-N'-(β-hydroxyethyl)thiourea and the gelatin tanning agent formaldehyde.

9. A light-sensitive element that after exposure is suitable for use as a lithographic printing master, said element comprising a support having coated thereon at least one light-sensitive layer comprising gelatin containing therein:

(a) as an image-forming component, at least one bleachable dye selected from the class consisting of (1) a pyrylium compound having the formula:

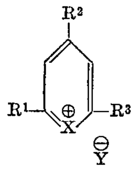

wherein each of $R^1$, $R^2$ and $R^3$ represents a member selected from the group consisting of an aliphatic group, an alkoxy group and an aryl group; $X^{\oplus}$ represents a hetero atom selected from the class consisting of an oxygen atom, a sulfur atom and a selenium atom; and $Y^{\ominus}$ represents an anion, and (2) those selected from the class consisting of a 2-β-anilinovinyl-1-methoxypyrydinium salt, a 1-anilinovinyl-3'-ethyl-4,6-di-p-tolyl-2-pyridothiacarbocyanine salt, a 3'-ethyl-1-(4-methylanilino-4,6-di-p-tolyl-2-pyridothiacarbocyanine salt, a 1,1-dimethoxy-2,2'-diphenyl-3,3'-indolocarbocyanine salt, and a 1-methoxy-1'-methyl-2,2'-10-triphenyl-3,3'-indolocarbocyanine salt, and (b) as a sensitizer, at least one light absorbing compound that contains a group selected from the class consisting of thiocarbonyl, mercapto, carbonyl peroxide and thioether.

10. A light-sensitive element as described in claim 9 wherein said composition additionally contains a non-oleophilic tanning agent for gelatin.

11. A light-sensitive element as described in claim 9 wherein the sensitizer is selected from the group consisting of:

(a) 1 allyl-2-thiourea
(b) S-diethyl thiourea
(c) N-allyl-N'-(β-hydroxyethyl)thiourea
(d) 2,2',2''-nitrilotriethanol
(e) Mercaptobenzoic acid
(f) 2-hydroxyethyl isothiuronium trichloroacetate
(g) Benzoylperoxide 12. A light-sensitive composition as described in claim 10 wherein the pyrylium image-forming compound is selected from the group consisting of 2,6-diphenyl-4-β-aminophenylthiapyrylium perchlorate,
2,6-di-β-methoxyphenyl-4-phenylthiapyrylium chloride,
2,6-diphenyl-4-β-carbomethoxyphenylpyrylium perchlorate,
2,6-diphenyl-4-β-aminophenylpyrylium perchlorate,
2,6-diphenyl-4-β-dimethylaminophenylthiapyrylium chloride,
4,6-diphenyl-2-(4-dimethylaminostyryl)pyrylium sulfoacetate,
2,6-di-(β-carbomethoxyphenyl)-4-phenylpyrylium fluoroborate, and
2,6-di-(p-methoxyphenyl)-4-phenylpyrylium fluoroborate.

13. A light-sensitive element that after exposure is suitable for use as a lithographic printing master, said element comprising a support having coated thereon at least one light-sensitive layer comprising gelatin containing therein:

(a) as an image-forming component, at least one bleachable dye selected from the class consisting of:

(1) a pyrylium compound having the formula:

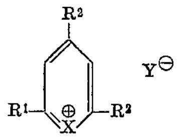

wherein each of $R^1$, $R^2$, and $R^3$ represents a member selected from the group consisting of an aliphatic group, an alkoxy group and an aryl group; $X^{\oplus}$ represents a hetero atom selected from the class consisting of an oxygen atom, a sulfur atom and a selenium atom; and $Y^{\ominus}$ represents an anion, and (2) those selected from the class consisting of a 2-β-anilinovinyl-1-methoxypyridinium salt, a 1-anilinovinyl-3'-ethyl-4,6-di-p-tolyl-2-pyridothiacarbocyanine salt, a 3'-ethyl-1-(4-methylanilino)-4,6-di-p-tolyl-2-pyridothiacarbocyanine salt, a 1,1-dimethoxy-2,2'-diphenyl-3,3'-indolocarbocyanine salt, and a 1-methoxy-1'-methyl-2,2',10-triphenyl-3,3'-indolocarbocyanine salt, and (b) as a sensitizer, at least one light absorbing compound selected from the class consisting of (1) 1-allyl-2-thiourea
(2) S-diethyl thiourea
(3) N-allyl-N'-(β-hydroxyethyl)thiourea
(4) 2,2',2''-nitrotriethanol
(5) Mercaptobenzoic acid
(6) 2-hydroxyethylisothiuronium trichloroacetate
(7) Benzoylperoxide, and (c) a non-oleophilic gelatin tanning agent.

14. A light-sensitive element as described in claim 13 wherein the tanning agent is selected from the group consisting of formaldehyde, succinaldehyde and glutaraldehyde.

15. A light-sensitive element that, after exposure, is suitable for use as a lithographic printing master, and element comprising a support having coated thereon at least one light-sensitive layer comprising gelatin containing therein the bleachable dye 2,6-diphenyl-4-p-aminophenylthiapyrylium perchlorate, the sensitizer 1-allyl-2-thiourea and the gelatin tanning agent formaldehyde.

16. A light-sensitive element that, after exposure, is suitable for use as a lithographic printing master, said element comprising gelatin containing therein a bleachable dye selected from the class consisting of:

2,6-diphenyl-4-p-aminophenylthiapyrylium perchlorate,
2,6-di-(p-methoxyphenyl)-4-phenylthiapyrylium chloride,
2,6-diphenyl-4-(p-carbomethoxyphenyl)pyrylium perchlorate,
2,6-diphenyl,4-aminophenyl pyrylium perchlorate,
2,6-diphenyl-4-(p-dimethylaminophenyl)thiapyrylium chloride,
4,6-diphenyl-2-(4-dimethylaminostyryl)pyrylium sulfoacetate,
2,6-di($\beta$-carbomethoxyphenyl)-4-phenylpyrylium fluoroborate,
2,6-di-(p-methoxyphenyl)-4-phenylpyrylium fluoroborate, the sensitizer N-allyl-N'-($\beta$-hydroxyethyl)thiourea and the gelatin tanning agent formaldehyde.

References Cited

UNITED STATES PATENTS

| | | | |
|---|---|---|---|
| 3,300,314 | 1/1967 | Rauner et al. | 96—89 |
| 1,871,830 | 8/1932 | Wendt et al. | 96—89 X |
| 1,880,573 | 10/1932 | Wendt et al. | 96—89 |
| 3,515,551 | 6/1970 | Audran et al. | 96—89 X |

NORMAN G. TORCHIN, Primary Examiner

W. H. LOUIE, Jr., Assistant Examiner

U.S. Cl. X.R.

96—33